(12) United States Patent
Matsuo (10) Patent No.: US 6,374,181 B1
(45) Date of Patent: Apr. 16, 2002

(54) NAVIGATION APPARATUS AND NAVIGATION METHOD FOR MOVABLE BODY

(75) Inventor: Kazunori Matsuo, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/717,323

(22) Filed: Nov. 22, 2000

(30) Foreign Application Priority Data

Nov. 25, 1999 (JP) .......................................... P11-333926

(51) Int. Cl.[7] .............................................. G01C 21/30
(52) U.S. Cl. ....................... 701/208; 701/210; 701/211; 340/990; 340/995
(58) Field of Search ................................. 701/208, 209, 701/210, 211, 212; 340/990, 995

(56) References Cited

U.S. PATENT DOCUMENTS 5,396,430 A * 3/1995 Arakawa et al. ............ 701/207
5,424,951 A * 6/1995 Nobe et al. .................. 701/200

* cited by examiner

*Primary Examiner*—Tan Nguyen
(74) *Attorney, Agent, or Firm*—Young & Thompson (57) ABSTRACT

A navigation apparatus for a movable body which assists in moving with a map while at least displaying the map is provided. A first information storing medium stores map data corresponding to the map thereon. A detecting device detects displayed map data corresponding to the map already displayed at least once from the first information recording medium. Then, a recording device records the displayed map data detected by the detecting device on a second storing medium, which has higher access speed than the first information storing medium.

20 Claims, 5 Drawing Sheets

DK: DVD-ROM Disc

NAVIGATION APPARATUS AND NAVIGATION METHOD FOR MOVABLE BODY

BACKGROUND OF THE INVENTION

1. Field of the Invention

The present invention relates to the technical field of navigation system for movable bodies. To be more precise, the invention relates to the technical field of navigation system for movable bodies such as vehicles, which assists the users in locating places with a map displayed to them.

2. Description of the Related Art

In recent years, navigation systems for movable bodies such as vehicles, that assist the users to move from one place to another while displaying the map of destination, etc, are widely used. In conventional navigation systems, data corresponding to the information regarding the map, etc. to be displayed was generally read at a required timing only from optical disks such as DVDs where the data was previously stored.

In such conventional configurations, all the data required for navigation processing are read from the optical disks. Therefore, a series of processing such as searching the data in the optical disk, reading it, and displaying it, were required in each and every map.

Thus, the problem of inhibiting speediness occurs when, for instance, the needs arise to scroll the displayed map at high speed to search the destination.

In the mean time, research and development are actively carried out in recent years to have so called hard disk that enables high-speed data retrieval installed in the navigation system and the data required to display the map, etc. read from the hard disk.

However, when all the data required to display the maps were to be stored in the hard disk, everything including even the data for less frequently used maps were to be stored in it. In such case, a problem occurs so that the data for the maps that are frequently used and are really necessary to be stored in the hard disk may not be stored in it because the memory in the hard disk is limited, and the data for less frequently used maps occupy much space.

If a large capacity hard disk is installed in the navigation system in order to obtain more free space for storing the data for the maps that are frequently used, then another problem results so that it invites upsizing of the navigation system itself and the price increase.

SUMMARY OF THE INVENTION

It is therefore an object of the present invention to provide a navigation system for moving bodies, that can display required maps quickly and is downsized and lower priced making good use of the memory capacity to store the data for displaying maps.

The above object of the present invention can be achieved by a navigation apparatus for a movable body which assists in moving with a map while at least displaying the map. The navigation apparatus is provided with: a first information storing medium for storing map data corresponding to the map thereon; a detecting device for detecting displayed map data corresponding to the map already displayed at least once from the first information recording medium; and a recording device for recording the displayed map data detected by the detecting device on a second storing medium having higher access speed than the first information storing medium.

According to the navigation apparatus of the present invention, the displayed map data is stored on the second information storing medium. Accordingly, by detecting the displayed map data from the second information storing medium when the displayed map is displayed again, the displayed map data can be detected more promptly than that is detected from the first information storing medium, and the displayed map can be displayed.

Also, only the displayed map data is stored in the second information storing medium, so the free space in the second information storing medium will be utilized without losses. As a result, the second information storing medium is used efficiently, and downsizing and low price of the vehicle navigation apparatus as a whole including the second information storing medium can be realized.

In one aspect of the navigation apparatus, the displayed map includes at least the map including an area through which the movable body has ever gone.

According to this aspect, if the movable body goes through the area again, the displayed map including the area can be promptly displayed.

In another aspect of the navigation apparatus, the displayed map includes at least the map only displayed and not including an area through which the movable body has ever gone.

According to this aspect, the map displayed at least once can be promptly displayed again even if the map including an area through which the movable body has not gone actually.

The above object of the present invention can be achieved by a navigation apparatus for a movable body which assists in moving with a map while at least displaying the map. The navigation apparatus is provided with: a first information storing medium for storing map data corresponding to the map thereon; a detecting device for detecting displayed map data corresponding to the map already displayed at least once from the first information recording medium; a recording device for recording the displayed map data detected by the detecting device on a second storing medium having higher access speed than the first information storing medium; and a displaying device for detecting the displayed map data, corresponding to the displayed map to be displayed when the displayed map is displayed again, from the second storing medium and for displaying the displayed map again.

According to the navigation apparatus of the present invention, the displayed map data is stored on the second information storing medium, and the displayed map data is detected from the second information storing medium when the displayed map data is displayed again, then the displayed map corresponding to the displayed map detected is displayed. Accordingly, by detecting the displayed map data from the second information storing medium when the displayed map is displayed again, the displayed map data can be detected more promptly than that is detected from the first information storing medium, and the displayed map can be displayed.

Also, only the displayed map data is stored in the second information storing medium, so the free space in the second information storing medium will be utilized without losses. As a result, the second information storing medium is used efficiently, and downsizing and low price of the vehicle navigation apparatus as a whole including the second information storing medium can be realized.

In one aspect of the navigation apparatus, the displayed map includes at least the map including an area through which the movable body has ever gone.

According to this aspect, if the movable body goes through the area again, the displayed map including the area can be promptly displayed.

In another aspect of the navigation apparatus, the displayed map includes at least the map only displayed and not including an area through which the movable body has ever gone.

According to this aspect, the map displayed at least once can be promptly displayed again even if the map including an area through which the movable body has not gone actually.

In another aspect of the navigation apparatus, the navigation apparatus is further provided with a position detecting device for detecting a current position. Then, the displaying device extracts the map data corresponding to the map including the current position detected by the position detecting device from the displayed map data stored on the second storing medium when the map including the current position is included in the displayed map, and displays the map including the current position.

According to this aspect, if the map including the current position is included in the displayed map, the map including the current position can be promptly detected and displayed.

In another aspect of the navigation apparatus, the displayed map includes at least the map including an area through which the movable body has ever gone.

According to this aspect, if the movable body goes through the area again, the displayed map including the area can be promptly displayed.

In another aspect of the navigation apparatus, the displayed map includes at least the map only displayed and not including an area through which the movable body has ever gone.

According to this aspect, the map displayed at least once can be promptly displayed again even if the map including an area through which the movable body has not gone actually.

In another aspect of the navigation apparatus, the displaying device extracts the map data, corresponding to an adjacent map which is adjacent to the map currently displayed and is not currently displayed, from the displayed map data stored on the second storing medium when the adjacent map is included in the displayed map, and displays the adjacent map.

According to this aspect, if the map is displayed while being scrolled and the map to be scrolled is the displayed map, the map can be promptly detected and displayed and scrolled.

The above object of the present invention can be achieved by a navigation method for a movable body which assists in moving with a map while at least displaying the map. The navigation method is provided with: the process of storing map data corresponding to the map on a first information storing medium; the process of detecting displayed map data corresponding to the map already displayed at least once from the first information recording medium; and the process of recording the displayed map data detected by the process of detecting on a second storing medium having higher access speed than the first information storing medium.

According to the navigation method of the present invention, the displayed map data is stored on the second information storing medium. Accordingly, by detecting the displayed map data from the second information storing medium when the displayed map is displayed again, the displayed map data can be detected more promptly than that is detected from the first information storing medium, and the displayed map can be displayed.

Also, only the displayed map data is stored in the second information storing medium, so the free space in the second information storing medium will be utilized without losses. As a result, the second information storing medium is used efficiently, and downsizing and low price of the vehicle navigation system as a whole including the second information storing medium can be realized.

In one aspect of the navigation method, the displayed map includes at least the map including an area through which the movable body has ever gone.

According to this aspect, if the movable body goes through the area again, the displayed map including the area can be promptly displayed.

In another aspect of the navigation method, the displayed map includes at least the map only displayed and not including an area through which the movable body has ever gone.

According to this aspect, the map displayed at least once can be promptly displayed again even if the map including an area through which the movable body has not gone actually.

The above object of the present invention can be achieved by a navigation method for a movable body which assists in moving with a map while at least displaying the map. The navigation method is provided with: the process of storing map data corresponding to the map on a first information storing medium; the process of detecting displayed map data corresponding to the map already displayed at least once from the first information recording medium; the process of recording the displayed map data detected by the process of detecting on a second storing medium having higher access speed than the first information storing medium; and the process of detecting the displayed map data, corresponding to the displayed map to be displayed when the displayed map is displayed again, from the second storing medium and displaying the displayed map again.

According to the navigation method of the present invention, the displayed map data is stored on the second information storing medium, and the displayed map data is detected from the second information storing medium when the displayed map data is displayed again, then the displayed map corresponding to the displayed map detected is displayed. Accordingly, by detecting the displayed map data from the second information storing medium when the displayed map is displayed again, the displayed map data can be detected more promptly than that is detected from the first information storing medium, and the displayed map can be displayed.

Also, only the displayed map data is stored in the second information storing medium, so the free space in the second information storing medium will be utilized without losses. As a result, the second information storing medium is used efficiently, and downsizing and low price of the vehicle navigation apparatus as a whole including the second information storing medium can be realized.

In one aspect of the navigation method, the displayed map includes at least the map including an area through which the movable body has ever gone.

According to this aspect, if the movable body goes through the area again, the displayed map including the area can be promptly displayed.

In another aspect of the navigation method, the displayed map includes at least the map only displayed and not including an area through which the movable body has ever gone.

According to this aspect, the map displayed at least once can be promptly displayed again even if the map including an area through which the movable body has not gone actually.

In another aspect of the navigation method, the navigation method is further provided with: the process of detecting a current position; the process of extracting the map data corresponding to the map including the current position detected by the process of detecting a current position from the displayed map data stored on the second storing medium when the map including the current position is included in the displayed map; and the process of displaying the map including the current position.

According to this aspect, if the map including the current position is included in the displayed map, the map including the current position can be promptly detected and displayed.

In another aspect of the navigation method, the displayed map includes at least the map including an area through which the movable body has ever gone.

According to this aspect, if the movable body goes through the area again, the displayed map including the area can be promptly displayed.

In another aspect of the navigation method, the displayed map includes at least the map only displayed and not including an area through which the movable body has ever gone.

According to this aspect, the map displayed at least once can be promptly displayed again even if the map including an area through which the movable body has not gone actually.

In another aspect of the navigation method, the navigation method is further provided with: the process of extracting the map data, corresponding to an adjacent map which is adjacent to the map currently displayed and is not currently displayed, from the displayed map data stored on the second storing medium when the adjacent map is included in the displayed map; and the process of displaying the adjacent map.

According to this aspect, if the map is displayed while being scrolled and the map to be scrolled is the displayed map, the map can be promptly detected and displayed and scrolled.

DETAILED DESCRIPTION OF THE PREFERRED EMBODIMENTS

The preferred embodiments of the present invention will be explained referring to the drawings.

The preferred embodiment described below is of a vehicle navigation system installed in movable bodies or vehicles, that assists the user of the affected vehicle in locating places by displaying a map, etc. with both DVD-ROM drive to detect the map data from the read only DVD-ROM that stores map data to display the maps, etc. and HD drive including the hard disk that can store the map data, etc. to be read.

[I] Configuration of the Navigation System for Vehicles

Figure 1:
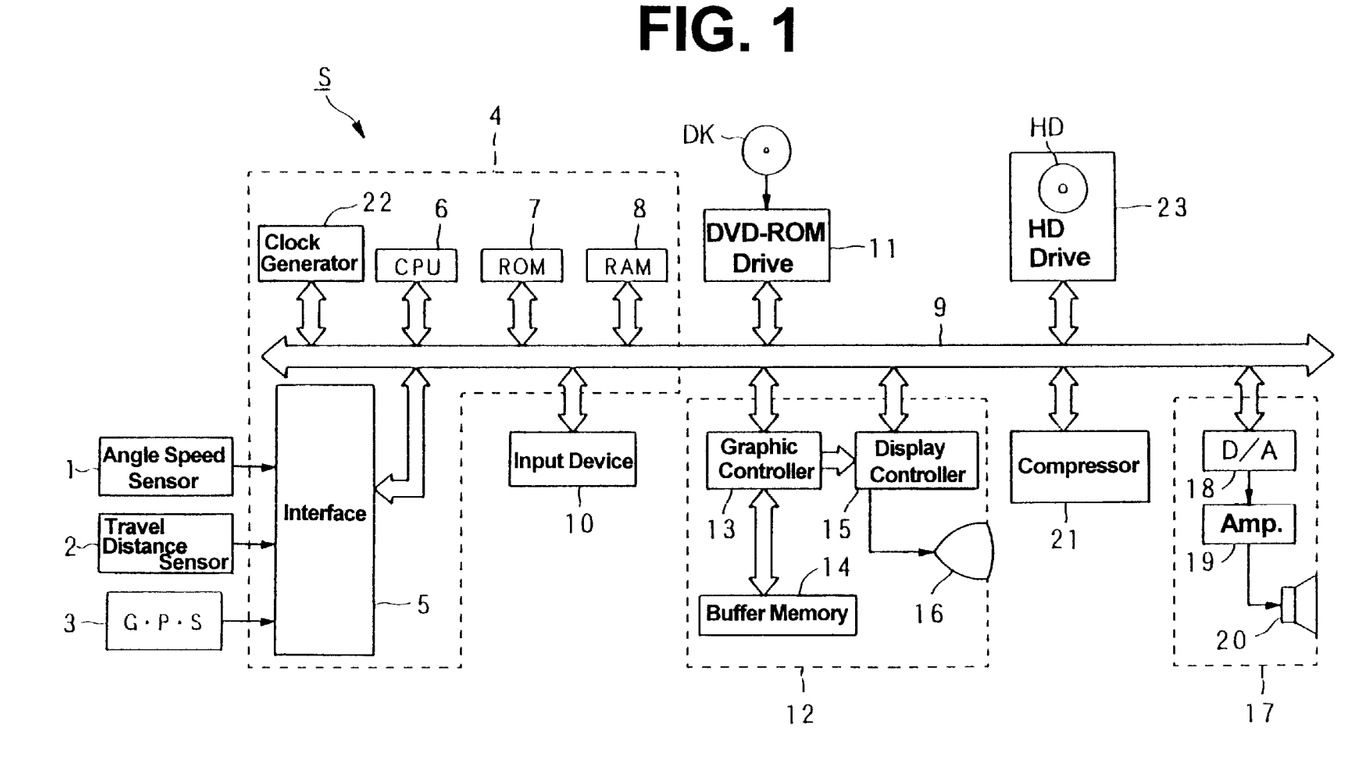
FIG. 1 is a block diagram showing the outline constitution of the vehicle navigation system in relation to the preferred embodiment.
Figure 2:
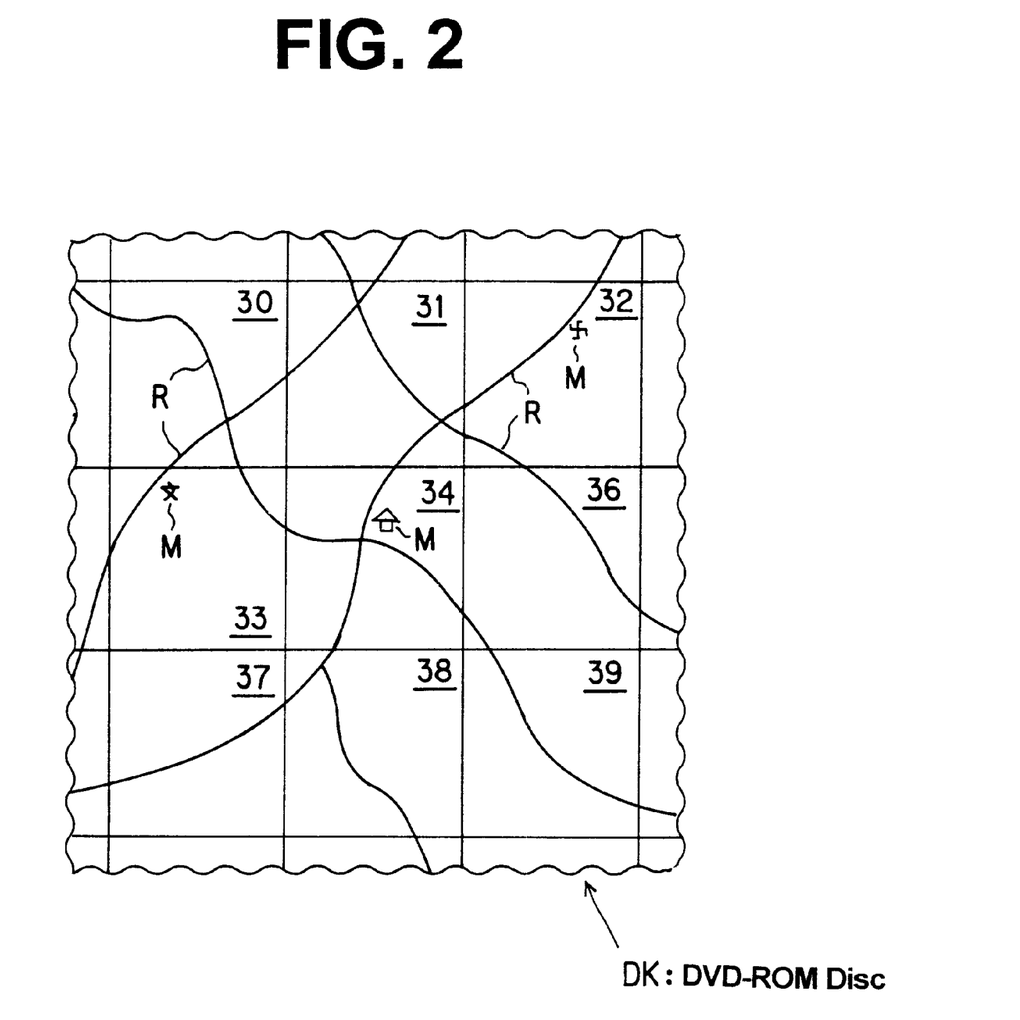
FIG. 2 is a diagram showing an embodiment of maps stored in the DVD-ROM disk.

First of all, the outline configuration and the operation of the vehicle navigation system in relation to the invention are explained in the drawings 1 and 2.

FIG. 1 is a block diagram showing outline configuration of the vehicle navigation system, and FIG. 2 is a diagram showing examples of map data form stored in the above DVD-ROM.

As shown in FIG. 1, the vehicle navigation system of the preferred embodiment includes an angle speed sensor 1, a travel distance sensor 2, a GPS (Global Positioning System) receiver 3, a system controller 4, an input device 10, a DVD-ROM drive 11, a display unit 12, a sound reproducing unit 17, compressor 21, and HD (Hard Disk) drive 23.

Then, the whole operation is explained as follows.

First of all, the angle speed sensor 1 detects an angle speed at the time of changing directions of the vehicle and outputs an angle speed data and a relative azimuth data to interface 5 described below.

Simultaneously, the travel speed sensor 2 calculates the number of pulses per rotation of the wheel by counting the number of pulses emitted as pulse signals resulted from the rotation of the wheels and outputs travel distance data based on the number of pulses per rotation to interface 5 described above.

Furthermore, the GPS receiver 3 receives electric wave from a GPS satellite and outputs GPS measuring data as well as absolute azimuth to interface 5 described above.

Then, system controller 4 controls the vehicle navigation system as a whole based on the relative azimuth data, the angle speed data, the travel distance data, the GPS measuring data, and the absolute azimuth data.

At this time, the input device 10 such as a remote controller device, etc. is used to enter various data.

Also, the DVD-ROM drive 11 reads the control program to execute the navigation processing and each piece of the map data described blow including road data such as the number of traffic lanes and width of roads from the DVD-ROM disk DK, and outputs to bus line 9 under control of system controller 4.

Then, display unit 12 displays various display data entered via the bus line 9 under control of system controller 4.

The sound reproducing unit 17 reproduces various sound data entered via the bus line 9 to be output in the vehicle under control of system controller 4.

The compressor 21 obtains the map data stored in the DVD-ROM disk DK and reproduced by DVD-ROM drive 11 through bus line 9, at the same time, compresses the data as required, and outputs the data to HD drive 23 again through bus line 9 to be stored in the self-contained hard disk HD.

The HD drive 23 stores (copies) the map data compressed in the compressor 21 or unprocessed data read from the DVD-ROM disk DK in the hard disk, and, at the same time, reads the same as required to output to bus line 9.

In the mean time, the system controller 4 has the interface 5 operating as an interface with external sensors such as GPS receiver 3, the CPU 6 controlling the system controller 4 as a whole and also executes map display processing, etc. described below, ROM 7 in which basic control program and the like to control the system controller 4 is stored, RAM (Random Access Memory) 8 including nonvolatile storage not shown in the figure, etc. and temporarily storing various data such as route data the users presets using the input device 10 to be read, and a clock generator 22 clocking current time based on time data from the GPS satellite received especially in the GPS receiver. It is connected to the input device 10, the DVD-ROM drive 11, the display unit 12, the sound regenerating unit 17, the compressor 21, and the HD drive 23 via bus line 9 described above.

Also, the display unit 12 includes a graphic controller 13 controlling the display unit 12 as a whole based on the control data sent via bus line 9 from CPU 6, a buffer memory 14 comprising memories such as VRAM (Video RAM) and temporarily storing image information that could be displayed immediately, and a display controller 15 controlling a display 16 such as liquid crystal panel or CRT (Cathode Ray Tube) based on the image data output from the graphic controller 13.

Also, the sound regenerating unit 17 includes a D/A (Digital/Analog) converter 18 converting digital data sent via bus line 9 from the RAM 8 or the HD drive 23 (voice digital data for navigation from the DVD-ROM drive 11 or the HD drive 23) into analog data, an amplifier 19 amplifying analog signals outputted from the D/A converter 18, and a speaker 20 converting the amplified analog signal into sounds to be outputted in a vehicle.

Then, form of storing map data in the DVD-ROM disk DK, which is previously stored in the DVD-ROM disk DK, is explained with reference to FIG. 2.

As generally known, the range of map data stored in one DVD-ROM disk DK is at least as vast as the whole of Kanto plain. The map, however, is not stored in the DVD-ROM disk DK as a piece of map, instead, the map is stored in a DVD-ROM disk DK as multiple crosscut pieces like a mesh denoted by numerals 30 to 34 and 36 to 39 as shown in FIG. 2.

Every piece of map is stored with road marks R and building marks M indicating roads and buildings that exist in the area included in every piece of map denoted by the numeral 30, etc.

When the map data is read from the DVD-ROM disk DK at the map display processing described below, the map data corresponding to each piece is read as one unit to be displayed as required in the display unit 12 and, at the same time, the map data corresponding to the piece which has displayed at least once is copied and stored in the hard disk HD via HD drive 23, then read again from the hard disk HD.

[II] Preferred Embodiment of the Basic Processing in the Map Display Processing

Figure 3:
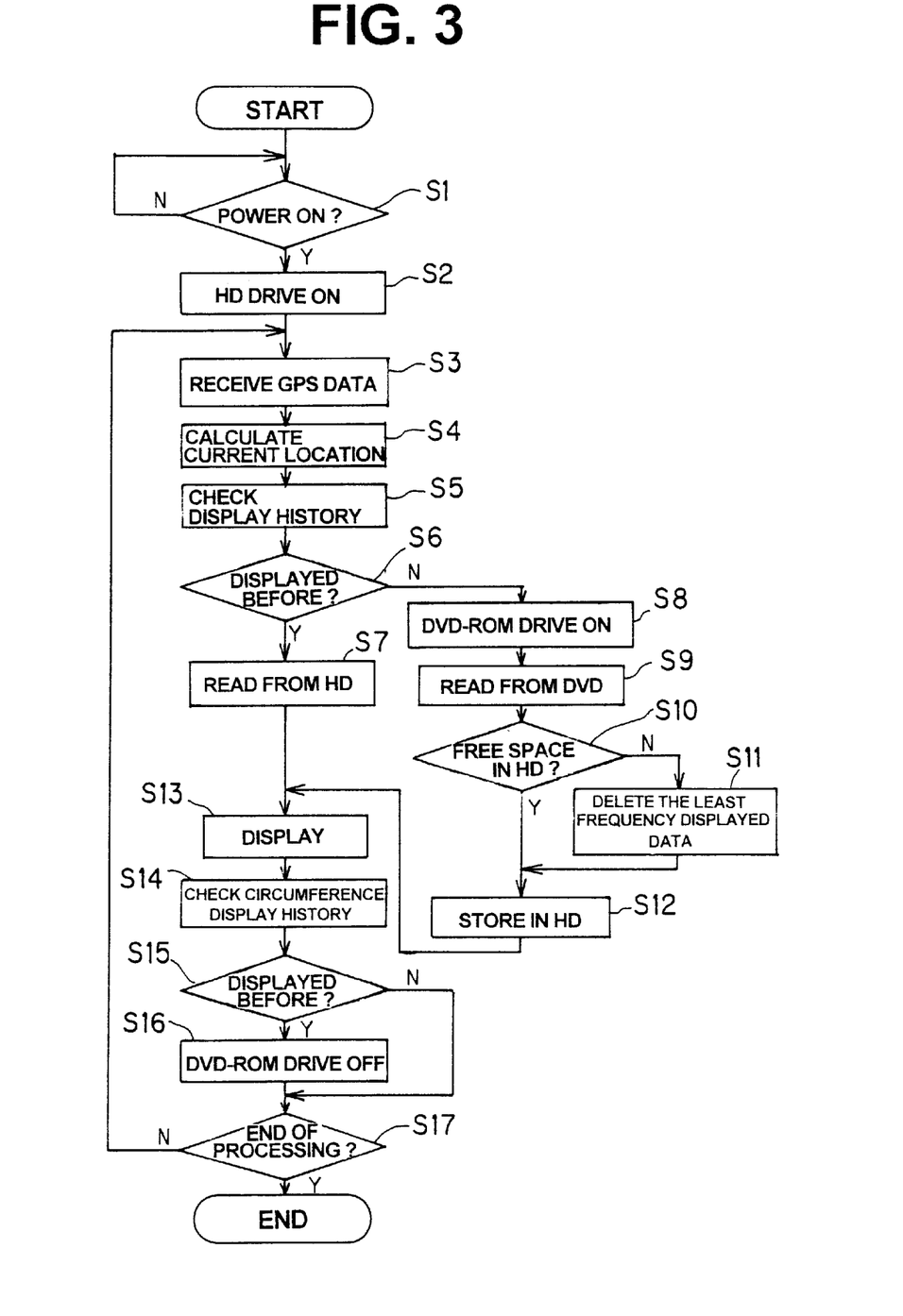
FIG. 3 is a flow chart showing basic processing of the map displaying processing in the preferred embodiment.

Now, basic processing common in the map display processing in relation to the invention is explained with reference to FIG. 3. FIG. 3 is a flow chart showing the basic processing.

Also, the basic processing shown in the flow chart of FIG. 3 is executed based on the program corresponding to the flow chart primarily in DVD-ROM drive 11, HD drive 23, and CPU 6. In addition, the program is stored separately from the map data in the DVD-ROM disk and read and used as required.

As shown in FIG. 3, in the basic processing of the map display processing in the preferred embodiment, first of all, it is determined whether power to the vehicle navigation system S itself is turned on or not (step S1). If it is not turned on (step S1; N), the processing is switched to stand-by state until it gets turned on. When it is turned on (step S1; Y), a spindle motor in HD drive 23 not shown in FIG. is started to run (step S2). The spindle motor is to rotate the hard disk HD at the predetermined number of rotation and is started in advance when the map data copied and stored in the hard disk HD is read.

Then, the GPS receiver 3 receives electric wave from the GPS satellite (step S3) and uses mainly the data included in the electric wave received and then calculates current location of the vehicle in which the vehicle navigation system S is installed using self-supporting measuring data output from the angle speed sensor 1 and the travel distance sensor 2 as a supplement (step S4).

Then, the map data corresponding to the piece of map including the calculated current location is checked if the map has displayed in the display unit 12 at least once (in other words the data has ever been displayed or not) (step S5, S6).

Once the map data corresponding to the piece that is displayed, then it is copied and stored in the HD in the map display processing of the preferred embodiment as described below. From then on, when the same map is displayed, it is read from the HD in order to display the map including the piece. To be concrete, the processing done in step S5 is to determine if the map data are those corresponding to the piece which has been displayed at least once by searching if the map data is stored in the HD.

And when the piece including the current location is displayed once or more (step S6; Y), the map data corresponding to the piece is read (step S7) from the HD via operating HD drive 23 (see step S2) and displayed in display unit 12 (Step S13).

Then, the pieces adjacent to the piece including the current location, which shows the peripheral areas, is checked if they have been displayed in the display unit 12 (in short, the piece has a history of being displayed) (Step S14, S15).

As for the processing done in steps S14 and S15, to be concrete, when the map data corresponding to all the pieces for circumference areas is stored in the HD, or when the map data corresponding to at least one piece of all the circumference pieces is store in the HD, the response for step S15 could be "Y". In addition, decision for the step S15 can be "Y" if the map data corresponding to the piece that shows the areas in the direction which the vehicle having the vehicle navigation system S is headed is stored in the HD.

When the piece of the adjacent areas is determined to be displayed before in Step S15 in the above mentioned methods (step S15; Y), the map data does not need to be read from the DVD-ROM disk DK, so the rotation of the spindle motor in DVD-ROM drive 11 is suspended (step S16). The spindle motor is to rotate the DVD-ROM DK at the predetermined number of rotation and is started in advance when the map data is read from the DVD-ROM disk DK similarly to the spindle motor in HD drive 23.

Then an input signal from the input device 10, etc. is checked if the navigation processing should be terminated or not (step S17), and if the processing should be terminated, then it terminates (step S17; Y). On the other hand, the processing goes back to step S3 if it is determined that the processing should not be terminated (step S17; N), and the navigation processing described above is continued.

When the piece is determined that it has never been displayed in step S15 (step S15; N), then the rotation of the spindle motor in each drive continues as the map data may still need to be read from the DVD-ROM disk DK and the processing goes on to step S17 (see steps S2 and S8).

On the other hand, when the piece including the current location is determined that it has never been displayed (step S6; N), the rotation of the spindle motor, which is not shown in FIG, in DVD-ROM drive 11 is started (step S8) and, simultaneously, the map data corresponding to the piece is read from the DVD-ROM disk DK through DVD-ROM drive 11 (step S9).

Then, capacity is checked to see if a space is available in the HD to copy and store the map data corresponding to the piece read from the DVD-ROM disk DK (step S10), and when there is not the space (step S10; N), the map data stored in the hard disk HD, which is the least frequently used, is deleted from the hard disk HD (step S11), and then, the map read from the DVD-ROM in the step S9 is copied and stored in the space that became available as a result of deletion (step S12) and the piece of the map data stored is displayed in the display unit 12 (step S13) and repeats the processing in step S14 described above and on.

In the processing in the step S12, the map data is stored in the HD together with the number of time that the piece is displayed and the graph, etc. to be used in the step S11 described above.

When there is a free space in the HD (step S10; Y), the map data read in the step S9 is copied and stored in the free space as it is (step S12), then it goes on to step S13.

[III]Preferred Embodiment of the Scroll Display Processing of the Maps

Figure 4:
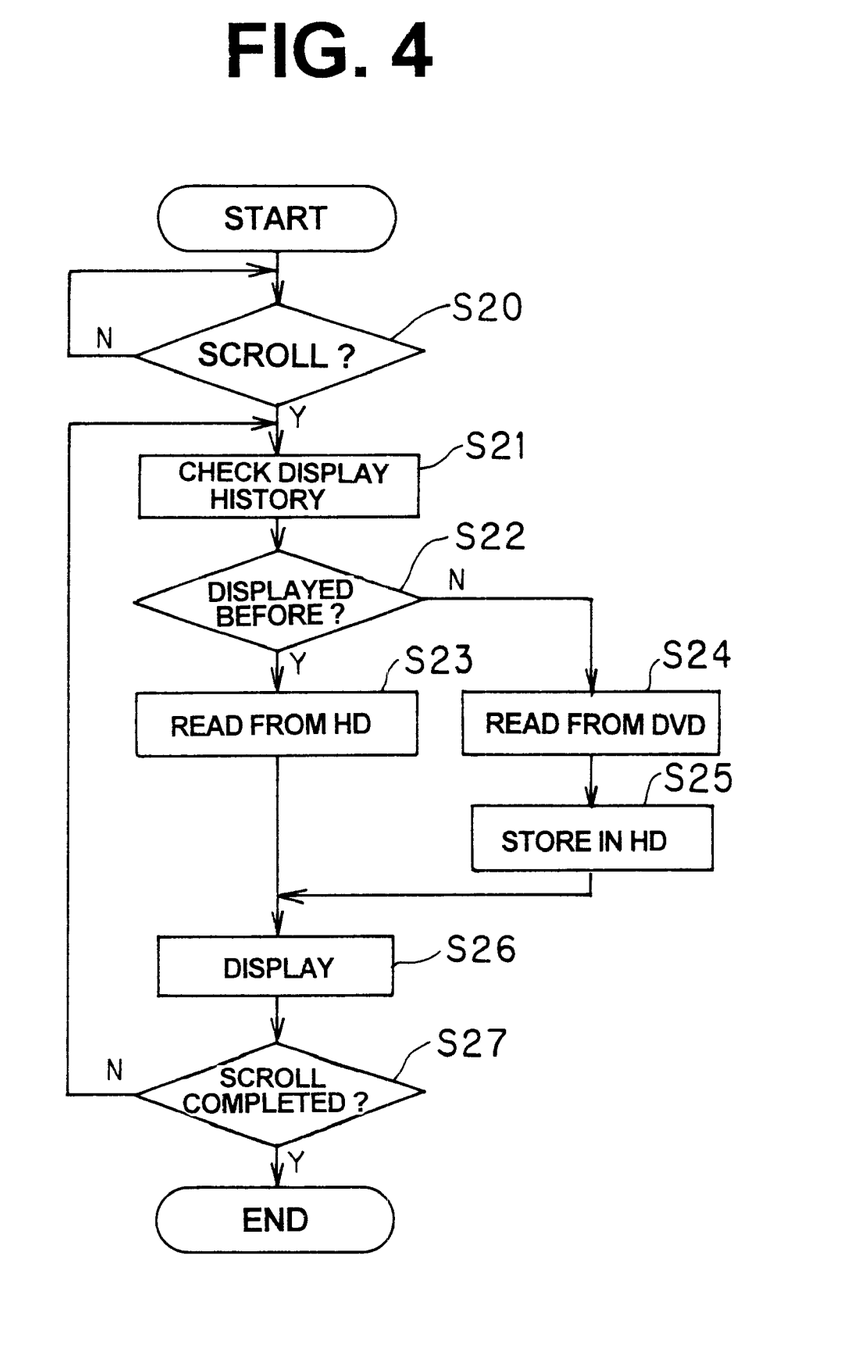
FIG. 4 is a flow chart showing scroll display processing in the preferred embodiment.

Now, the scroll display processing of the map in the invention is explained using FIG. 4. The scroll display processing is to display the maps that are not currently displayed by scrolling the map to the direction the user wants to display regardless of the direction to which the vehicle is heading or movement of the vehicle if it is movning. FIG. 4 is a flow chart showing the scroll display processing.

The processing described in the flow chart in FIG. 4 is executed primarily in DVD-ROM drive 11, HD drive 23, and CPU 6 in accordance with the program corresponding to the flow chart.

The scroll processing in the preferred embodiment described in FIG. 4 starts with checking if an operation to execute the scroll display processing or to scroll the map displayed is done in the input device 10 (step S20).

If the operation is not done (step S20; N), the processing is switched to stand-by state until it is done. If the operation is done (step S20; Y), the piece that became necessary to be displayed due to the scroll instruction is checked if it has ever been displayed (steps S21 and S22). The piece is the one which is not displayed and is supposed to be in the direction to be scrolled by the scroll instruction.

For instance, to describe the processing in the step S22 in concrete terms, when the map data corresponding to the piece that becomes necessary to be displayed is already stored in the HD, the answer for the step S22 is "Y".

When the piece which become necessary to be displayed is determined that it has have been displayed before in step S22 (step S22; Y), the map data is read from the HD (step S23) and the piece is displayed (step S26), then the input signal from input device 10, etc. is checked if the scroll display is terminated or not (step S27). When it should be terminated (step S27; Y), the processing is terminated, and if not (step S27; N) the processing goes back to step S21 to continue the scroll processing described above.

On the other hand, when the piece became required to be displayed in step S22 does not have a history of being displayed before (step S22; N), the map data corresponding to the piece to be displayed but has not been displayed is read from DVD-ROM DK via the DVD-ROM drive 11 (step S24), and the map data read is copied and stored in the hard disk DK (step S25). The piece corresponding to the copied and stored map data is displayed in the display unit 12 (step S26) and the processing in step S27 described above is executed.

When the answer for step S22 question in the scroll display processing in FIG. 4 is Y, the DVD-ROM drive 11 spindle motor rotation is ceased as the map data for scroll display is not required to be read from the DVD-ROM disk DK immediately, then the processing in step S23 and after can be carried out.

Also, when the map data read in the processing in step S24 above is copied and stored in the HD, processing shown in steps S10 and S11 are executed, then it can goes on to step S25.

As described above, by the basic processing of the map display processing and the scroll display processing in relation to the preferred embodiment, the map data corresponding to the piece of map that has been displayed at least once is copied and stored in the hard disk HD that enables the data to be detected at high speed. When the piece of map is to be displayed again, the map data will be retrieved from the hard disk to be displayed, which is quicker compared to retrieving the data from the DVD-ROM disk DK.

Also, only the map data is stored in the hard disk HD, so the free space in the hard disk HD will be utilized without losses. As a result, the hard disk HD is used efficiently, and downsizing and low price of the vehicle navigation system as a whole including HD drive 23 can be realized.

In addition, the pieces of map copied and stored in the hard disk HD at least includes areas where the vehicle has traveled, so the pieces of map will be displayed promptly when the vehicle travels the same area again.

Also, the pieces of map copied and stored in the hard disk HD at least include those displayed only, so those pieces of map are displayed promptly once they are displayed even if those are the area where the vehicle has never actually gone through.

Also, when the pieces of map copied and stored in the hard disk HD include the piece with the current location of the vehicle, the piece of map with the current location will be detected and displayed promptly as the map data corresponding to the piece of map including to the current location is to be retrieved to be displayed.

When the pieces of map copied and stored in the hard disk HD include those that are adjacent and are required for the scroll display processing, the map data corresponding to the adjacent pieces will be extracted from the map data recorded in the hard disk HD to be displayed, so when the map is scrolled, the piece to be scrolled will be extracted and scrolled promptly.

When the data needed not to be read from the DVD-ROM disk DK, the spindle motor in DVD-ROM drive 11 will be stopped. As a result, the power consumed in the vehicle navigation system as a whole will be reduced.

[IV]Preferred Embodiment of the Route Setting/Navigation Processing

Figure 5:
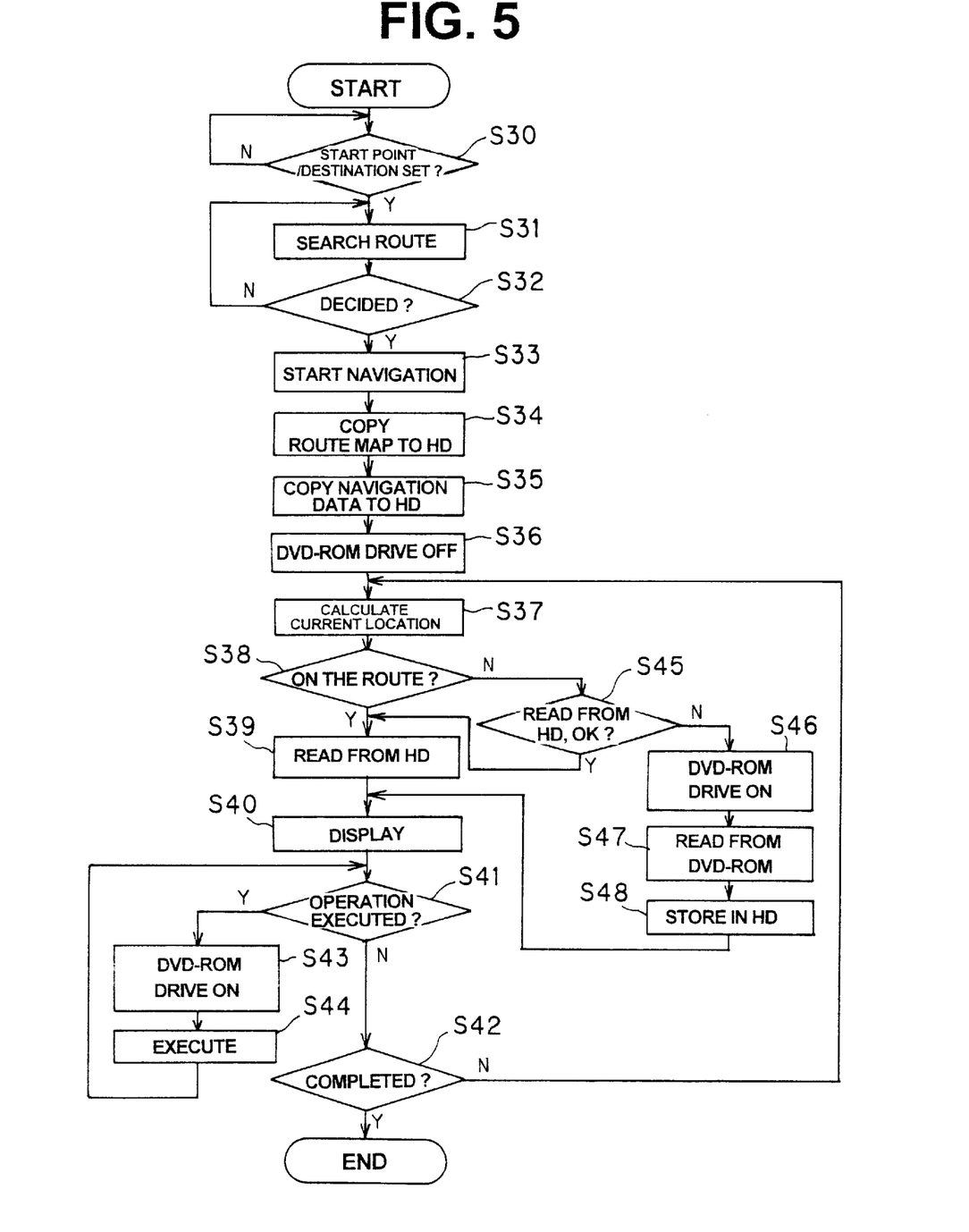
FIG. 5 is a flow chart showing the route setting and navigation processing.

Preferred embodiment of the route setting and navigation processing of the invention is explained using FIG. 5. FIG. 5 is a flow chart showing the route setting and the navigation processing.

The processing shown in the flow chart of FIG. 5 is executed mainly in DVD-ROM drive 11, HD drive 23, and CPU 6 in accordance with the program corresponding to the flow chart as in the cases shown in FIGS. 3 and 4.

As shown in FIG. 5, in the route setting and the navigation processing in relation to the preferred embodiment, first of all, it determined if the start point and the destination that the vehicle is planned to travel are entered by the user via the input device 10 (step S30). If the answer to that is No (step S30; N), then the processing is switched to stand-by state until the entry is made, and if the entry is made (step S30;

Y), the route the vehicle is supposed to go is retrieved base on the start point and the destination set (step S31). At this time, multiple routes with different conditions but not just one route are retrieved.

Then one of the multiple routes proposals is selected in the input device 10. Whether or not the selection of one route is made is determined (Step S 32). If the selection is not made (step S32; N), the processing goes back to step S31 to find other routes with different conditions. When the route is decided (Step S 32; Y), then actual navigation processing is started in accordance with the determined route (Step 33). Simultaneously, the map data corresponding to the pieces of map with the area on the route is read from the DVD-ROM disk to be copied and stored in the hard disk HD (Step S34), and the voice data and other instructive data required to guide through the route is read from the DVD-ROM disk DK to be copied and stored in the hard disk HD (Step S35).

In the map data copying and storing process in Step S34, the pieces of map of every scales on the route are copied and stored. In the copying and storing of the instructive data in Step S35, for instance, the voice data for giving instructions required to navigate, and data for enlarged display of every intersection, or special data for navigation in case of traveling in the highway are copied and stored.

Before going on to the processing in Step S34, the processing done in Steps S10 and S11 shown in drawing 3 can be executed.

When every copying and storing process are completed, there will be no more necessity to read any data from the DVD-ROM disk DK for the route navigation processing, and the spindle motor in DVD-ROM drive 11 are ceased to rotate (Step S36).

Then, as shown in the step S3, the current location of the vehicle is calculated by receiving the radio wave from the GPS satellite (Step S37), and the calculated current location is determined if it is on the above mentioned route that is set (Step S38).

When the current location is on the route (Step S38; Y), the map data copied and stored in the hard disk HD in the Step S34 is read (Step S39) and displayed (Step S40), and the instructive data copied and stored in the above mentioned step S35 is read from the hard disk HD to continue the relevant navigation.

During the navigation, decision is made to determine if the user carries out an operation to instruct the vehicle navigation system to perform other processing than the navigation through the input device 10 (Step S41), if the user carries out the operation (Step S41; Y), the rotation of the spindle motor in DVD-ROM drive 11 is started in order to read the data required for the operation from the DVD-ROM disk DK (Step S43), and the processing designated in step S41 is performed using the data that is read (Step S44) to go back to the navigation processing in Step S41.

In the mean time, when no operation is made in Step S41 (S41; N), then it is determined whether or not any operation has ever done by the user to terminate the navigation process through the input device 10, etc. (Step S43), and if any operation has done (Step S43; Y), the processing is terminated, and if any operation has not done (Step S34; N), the processing goes back to Step S37 to repeat the above mentioned processing to continue navigation process.

In step S38, when the current location of the vehicle is not on the planned route (Step S38; N), then whether or not the map data to display the piece of map including the current location off the route is already stored in the hard disk HD is determined (Step S45).

When the map data is already stored (Step S45; Y), the processing goes on to step S39 to continue navigation using the stored map data, and if the map data to display the piece including the current location off the route is not stored in the hard disk (Step S45; N), the rotation of the spindle motor is started in DVD-ROM drive 11 in order to read the required map data from the DVD-ROM disk DK (step S46), and the data to navigate from the current location off the route is read from the DVD-ROM disk DK which is rotating (step S47), and the data that is retrieved is copied and stored in the hard disk HD (step S48), then the processing goes on to step 40 to continue navigation using the data copied and stored.

Before doing the processing in step S48, the processing in steps S10 and S11 shown in FIG. 3 can be carried out.

In the route setting and the navigation processing explained above, navigation is carried out by retrieving the data required to navigate from the hard disk HD while traveling the fixed route, so that the navigation is done along the route promptly and accurately.

In each of the preferred embodiment described above, the configuration was that the map data, etc. required for the navigation process is copied from the DVD-ROM disk DK and stored in the hard disk HD, and those data are reproduced from the hard disk HD. Other than this, it can be that a part of the data copied and stored in the hard disk HD is copied and stored in RAM 8, and the data copied and stored is retrieved from RAM 8 in order to perform the navigation processing.

In this case, rotation of the hard disk can also be stopped so that the power consumption will be even less.

Also, in each of the preferred embodiment described above, when it is not necessary to retrieve data from the DVD-ROM disk DK, the user can enjoy music in the vehicle while being serviced by the navigation processing by loading the DVD disk for music regeneration, for instance, in DVD-ROM drive 11.

In the above-mentioned embodiment, the map data is recorded on the DVD-ROM. In addition, other recordable optical disc, such as CD-R, CD-R/W (Rewritable), DVD-R (Recordable), DVD-R/W (Rewritable), DVD-RAM (Random Access Memory), etc. can be used for storing the map data.

Further, in the above-mentioned embodiment, the vehicle is used for an example of a movable body. However, the movable body is not limited to the vehicle. For example, the present invention can be used for an airplane, a boat, etc. Furthermore, if the navigation system is applied for a mobile device, such as a notebook-size personal computer, a mobile computer, a cellular phone, etc., a user can accurately find a present position while carrying it.

Moreover, a main processing of the above-mentioned navigation operation can be executed in a navigation center build as a building. Then a result of the main processing can be transmitted to a terminal device having a display, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H(Heisei)11-333926 filed on Nov. 25, 1999 including the specification, claims, drawings and summary is incorporated herein by reference in its entirety.

What is claimed is:

1. A navigation apparatus for a movable body which assists in moving with a map while at least displaying the map, comprising:
   a first information storing medium for storing map data corresponding to the map thereon;
   a detecting device for detecting displayed map data corresponding to the map already displayed at least once from the first information recording medium; and
   a recording device for recording the displayed map data detected by the detecting device on a second storing medium having higher access speed than the first information storing medium.

2. The navigation apparatus according to claim 1, wherein the displayed map includes at least the map including an area through which the movable body has ever gone.

3. The navigation apparatus according to claim 1, wherein the displayed map includes at least the map only displayed and not including an area through which the movable body has ever gone.

4. A navigation apparatus for a movable body which assists in moving with a map while at least displaying the map, comprising:
   a first information storing medium for storing map data corresponding to the map thereon;
   a detecting device for detecting displayed map data corresponding to the map already displayed at least once from the first information recording medium;
   a recording device for recording the displayed map data detected by the detecting device on a second storing medium having higher access speed than the first information storing medium; and
   a displaying device for detecting the displayed map data, corresponding to the displayed map to be displayed when the displayed map is displayed again, from the second storing medium and for displaying the displayed map again.

5. The navigation apparatus according to claim 4, wherein the displayed map includes at least the map including an area through which the movable body has ever gone.

6. The navigation apparatus according to claim 4, wherein the displayed map includes at least the map only displayed and not including an area through which the movable body has ever gone.

7. The navigation apparatus according to claim 6, wherein the displaying device extracts the map data, corresponding to an adjacent map which is adjacent to the map currently displayed and is not currently displayed, from the displayed map data stored on the second storing medium when the adjacent map is included in the displayed map, and displays the adjacent map.

8. The navigation apparatus according to claim 4, further comprising a position detecting device for detecting a current position, wherein the displaying device extracts the map data corresponding to the map including the current position detected by the position detecting device from the displayed map data stored on the second storing medium when the map including the current position is included in the displayed map, and displays the map including the current position.

9. The navigation apparatus according to claim 8, wherein the displayed map includes at least the map including an area through which the movable body has ever gone.

10. The navigation apparatus according to claim 8, wherein the displayed map includes at least the map only displayed and not including an area through which the movable body has ever gone.

11. A navigation method for a movable body of assisting in moving with a map while at least displaying the map, comprising the process of:
    storing map data corresponding to the map on a first information storing medium;
    detecting displayed map data corresponding to the map already displayed at least once from the first information recording medium; and
    recording the displayed map data detected by the process of detecting on a second storing medium having higher access speed than the first information storing medium.

12. The navigation method according to claim 11, wherein the displayed map includes at least the map including an area through which the movable body has ever gone.

13. The navigation method according to claim 11, wherein the displayed map includes at least the map only displayed and not including an area through which the movable body has ever gone.

14. A navigation method for a movable body of assisting in moving with a map while at least displaying the map, comprising the process of:
    storing map data corresponding to the map on a first information storing medium;
    detecting displayed map data corresponding to the map already displayed at least once from the first information recording medium;
    recording the displayed map data detected by the process of detecting on a second storing medium having higher access speed than the first information storing medium; and
    detecting the displayed map data, corresponding to the displayed map to be displayed when the displayed map is displayed again, from the second storing medium and displaying the displayed map again.

15. The navigation method according to claim 11, wherein the displayed map includes at least the map including an area through which the movable body has ever gone.

16. The navigation method according to claim 11, wherein the displayed map includes at least the map only displayed and not including an area through which the movable body has ever gone.

17. The navigation method according to claim 16, further comprising the process of:
    extracting the map data, corresponding to an adjacent map which is adjacent to the map currently displayed and is not currently displayed, from the displayed map data stored on the second storing medium when the adjacent map is included in the displayed map; and
    displaying the adjacent map.

18. The navigation method according to claim 11, further comprising the process of:
    detecting a current position;
    extracting the map data corresponding to the map including the current position detected by the process of detecting a current position from the displayed map data stored on the second storing medium when the map including the current position is included in the displayed map; and
    displaying the map including the current position.

19. The navigation method according to claim 18, wherein the displayed map includes at least the map including an area through which the movable body has ever gone.

20. The navigation method according to claim 18, wherein the displayed map includes at least the map only displayed and not including an area through which the movable body has ever gone.

* * * * *